United States Patent
Krause et al.

[15] 3,655,255
[45] Apr. 11, 1972

[54] ACOUSTIC-OPTIC ULTRASONIC DEVICES USING GERMANIUM CONTAINING CHALCOGENIDE GLASSES

[72] Inventors: John Thorvald Krause, New Providence; Charles Robert Kurkjian, Somerset, both of N.J.

[73] Assignee: Bell Telephone Laboratories, Incorporated, Murray Hill, Berkeley Heights, N.J.

[22] Filed: July 13, 1970

[21] Appl. No.: 54,189

[52] U.S. Cl. .............................350/1, 250/83.3 R, 106/47, 350/161
[51] Int. Cl. ...............................................G02f 1/34
[58] Field of Search .............350/161, 1; 106/47; 250/83.3

[56] References Cited

UNITED STATES PATENTS 3,360,649  12/1967  Brau et al. ..................350/1
3,370,964  2/1968   Hilton, Jr. et al. ..........350/1
3,370,965  2/1968   Hilton, Jr. et al. ..........350/1

OTHER PUBLICATIONS

Walsh, T. E., " Infrared Modulation Techniques," Electo-Technology, Feb. 1969, pp. 29– 33.
Savage, J. A. et al., " Chalcogenide Glasses....A State of the Art Review," Infrared Physics, Vol. 5, pp. 195– 204.

*Primary Examiner*—Ronald L. Wibert
*Assistant Examiner*—Jeff Rothenberg
*Attorney*—R. J. Guenther and Edwin B. Cave

[57] ABSTRACT

Acousto-optic and ultrasonic devices are described which are dependent for their operation on certain germanium-containing compositions of the chalcogenide family of glasses. The acousto-optic devices made from these glasses exhibit high efficiencies when compared to those of devices constructed of earlier materials. The ultrasonic devices exhibit acoustic losses comparable to those of devices made from fused silica.

9 Claims, 10 Drawing Figures

Patented April 11, 1972
3,655,255
4 Sheets-Sheet 1
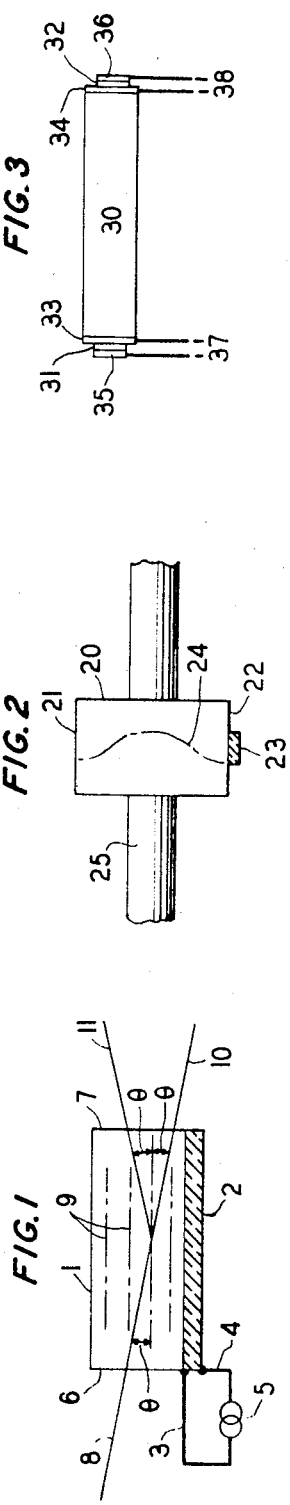
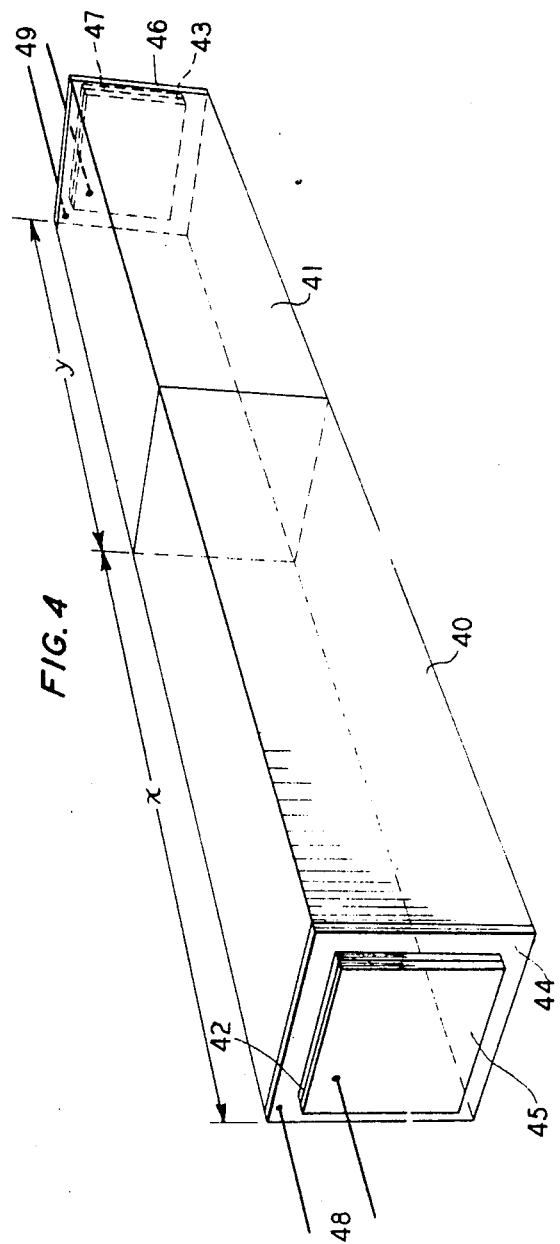
INVENTORS J.T. KRAUSE
C.R. KURKJIAN
BY John C. Fox
ATTORNEY Patented April 11, 1972 3,655,255

ACOUSTIC-OPTIC ULTRASONIC DEVICES USING GERMANIUM CONTAINING CHALCOGENIDE GLASSES

BACKGROUND OF THE INVENTION

1. Field of the Invention

This invention relates to acousto-optic devices, such as modulators, deflectors, correlators and switches, and to acoustic devices such as ultrasonic delay lines, all of which depend for their operation upon germanium-containing chalcogenide glasses.

2. Prior Art

The field of communications research has for some time included efforts to find glasses other than fused silica which exhibit low acoustic losses. Such materials would be candidates for use in a variety of significant communications devices both commercial and experimental. Examples include acoustic transmission devices such as ultrasonic delay lines and the so-called acousto-optic devices such as modulators, deflectors, correlators, switches, etc.

Of major concern for acoustic devices are glassy materials having low acoustic loss. Glasses are generally preferred over crystalline materials since they are invariably isotropic with respect to elastic waves, that is, they lack crystallographic axes, thus obviating the need to orient to preferred directions. In addition, glasses are generally more easily obtainable in large sections of optical quality than are single crystalline materials. No known glasses have been found to exhibit as low an acoustic loss as fused silica. Unfortunately, fused silica also exhibits a significant negative temperature coefficient of delay time, requiring for more critical applications a thermostated enclosure or its use with higher loss glasses or with single crystalline materials in a composite element. The search, therefore, continues for glassy materials having both low loss and zero or near zero temperature coefficients of delay time.

The operation of acousto-optic devices involves altering in some way electromagnetic radiation traveling through the acousto-optic material by the application of an applied acoustic signal. An important requirement of the acousto-optic material, in addition to its having low acoustic loss, is a high efficiency of the acousto-optic interaction, i.e., a large portion of the total electromagnetic energy altered due to application of the acoustic signal.

A large number of materials have been examined in the search for high acousto-optic efficiency. See, for example, Journal of Applied Physics, Vol. 38, p. 5,149 (1967). Recent crystalline 38, which appear to be among the most promising materials at this time, are $PbMoO_4$, for use with electromagnetic radiation of visible and near visible wavelength (described in copending application Ser. No. 821,894, filed May 5, 1969, assigned to the present assignee), and Ge, for use with infrared radiation. While each of these materials possesses acceptable values of acoustic loss and acousto-optic efficiency, neither is sufficiently transparent over a range broad enough to be useful with both the Nd-YAG laser (1.06 micron) and the $CO_2$ laser (10.6 micron).

Development efforts continue to include the search for materials which would be suitable candidates for acousto-optic applications.

SUMMARY OF THE INVENTION

The invention resides in the discovery that certain glass compositions are suitable for use in a wide variety of otherwise known acousto-optic and acoustic devices. These glasses include ternary compositions of non-oxide chalcogenide glasses containing germanium, including compositions from the ternary systems Ge-As-Se, Ge-P-S, Ge-P-Se, Ge-As-S and Ge-Sb-Se, Ge-Sb-S and have been found to have acoustic losses comparable to that of fused silica. In addition, these glass compositions have high acousto-optic figures of merit and present inherent advantages over many single crystalline acousto-optic materials, such as relative ease of fabrication of large optical quality sections and freedom from directional dependence of elastic wave behavior.

Consistent with ordinary usage, "acousto-optic" has reference to the interaction of elastic waves and electromagnetic waves generally, regardless of frequency. However, the materials of the invention impose a wavelength limit on the "optic" energy, these materials being substantially transparent within the bandwidth of about 1 to 14 microns.

The term "acoustic" is intended to include any elastic wave, including those within the audio, sonic, supersonic and ultrasonic frequency ranges. However, in general, acousto-optic device requirements call for the elastic wavelength to be equal to or greater than one-half of the optical wavelength in the acousto-optic medium.

While several typical embodiments of the two classes of devices (acousto-optic and acoustic) are described, it is to be understood that the materials are useful in virtually all acousto-optic and acoustic applications.

BRIEF DESCRIPTION OF THE DRAWING

FIG. 1 is a diagrammatic view, partly in section, of an acousto-optic deflector utilizing one of the herein-described glass compositions as the operative element;

FIG. 2 is a diagrammatic view of a resonant acousto-optic device operating as a laser mode locking structure utilizing one of the herein-described glass compositions as the operative element;

FIG. 3 is a diagrammatic view of an acoustic transmission device utilizing one of the herein-described glass compositions as the transmitting medium;

FIG. 4 is a diagrammatic view of a composite acoustic transmission device utilizing one of the herein-described glass compositions as one of the elements of the acoustic transmission medium;

FIG. 5 is a ternary composition diagram showing the low-loss range of compositions in the system Ge-Se-As;

FIG. 6 is a diagram similar to that of FIG. 5 for the system Ge-S-As;

DETAILED DESCRIPTION

Devices

Figure 5:
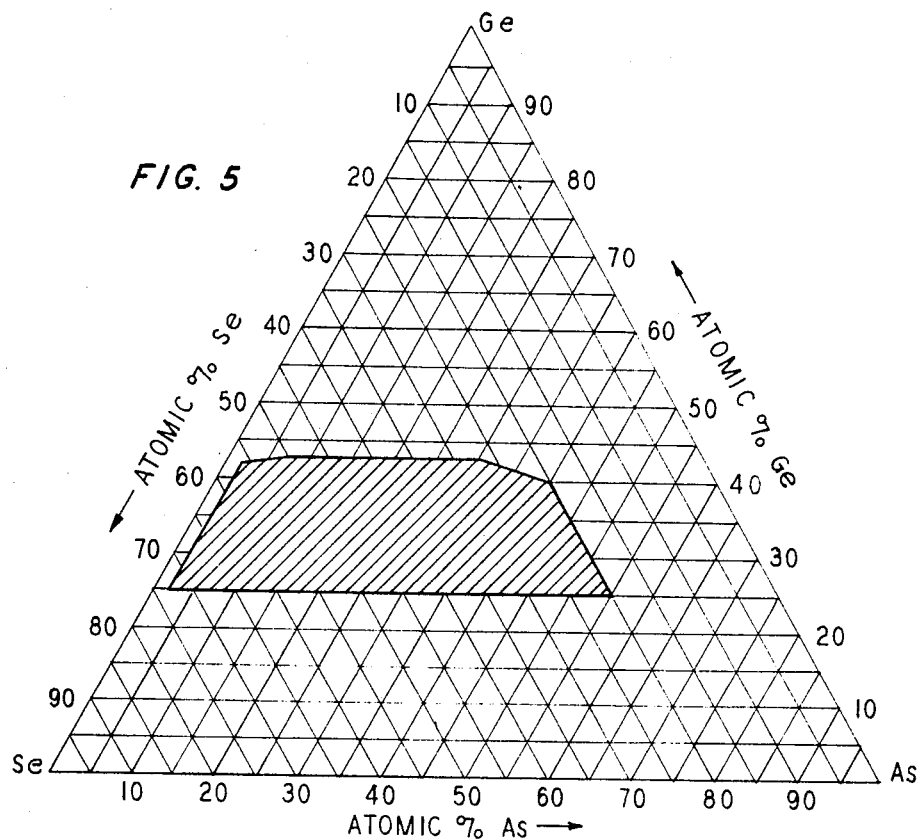

Referring now to FIG. 1, there is shown one embodiment of a Bragg deflector consisting of an acousto-optic element 1, made of a material herein and elastic wave source 2. Source 2 may be a piezoelectric transducer medium, for example, of lithium niobate and in this illustration is shown with attached electrodes 3 and 4 connected with a.c. or modulating source 5. Element 1 is provided with optically polished surfaces 6 and 7. Transparent coatings may be applied to these surfaces to protect them or to minimize reflection losses, or both. In operation, a beam 8 of electromagnetic wave energy (which may be focused or defocused by a lens system, not shown) of a wavelength within the transparency bandwidth of the element 1, is introduced (after being refracted at the surface) at some angle, $\theta$, to the advancing elastic wave fronts diagrammatically denoted 9. While some of beam 8 continues through element 1 and exits as beam 10 in the direction of beam 8, a discrete portion is deflected by interaction with the elastic wave into an angle $2\theta$ and emerges as beam 11.

The diagrammatic view of FIG. 1 illustrates the most efficient mode of operation of a Bragg deflector in accordance with which the incident and diffracted beams are at the same angle, known as the Bragg angle, to the advancing elastic wave front. Bragg deflectors are, however, operative over a limited range of angles centered about this optimum orientation. For some operating conditions in which the elastic wave length is appreciably larger than the light wavelength, the diffraction angle $2\theta$ may be approximated as equal to the ratio of the light wavelength to the elastic wavelength. Since the elastic wavelength is inversely proportional to the elastic frequency, the diffraction angle for a given light wavelength is approximately proportional to the elastic wave frequency. Variation in this frequency therefore permits selection of any of a variety of deflection angles. Advantage may be taken on this relationship in a multiposition $x$, $y$ deflector system incorporating two Bragg deflectors, one for the $x$ direction and one for the $y$ direction.

The device of FIG. 1 may also be operated to perform the information processing functions of pulse compression, correlation, filtering, spectrum analysis, etc., by suitably varying the frequency and/or amplitude of source 5.

Referring now to FIG. 2, there is shown an acousto-optic element arranged for mode locking a laser. The acousto-optic element 20 is equipped with reflecting ends 21 and 22. Elastic wave transducer 23 energized at the appropriate frequency by means, not shown, results in a standing elastic wave 24. Broken section 25 represents a portion of a laser cavity. Mode locking results when the acousto-optic element 20 is so designed and operated as to produce a diffraction of the same periodicity (or multiples thereof) as the resonant frequency which separates longitudinal and transverse modes of the laser.

The strength of the acousto-optic interaction may be specified in terms of an acousto-optic figure of merit:

$$M_2 = \frac{n^6 p^2}{\rho v^3} \qquad (1)$$

which is related to material properties of the acousto-optic medium. In this expression, $n$ is the refractive index, $p$ is the photo-elastic constant, $v$ is the acoustic wave velocity (all of which depend upon the polarizations of the optical and acoustic waves), and $\rho$ is the density of the acousto-optic medium. Values of the figure of merit have been calculated for both longitudinal and shear elastic waves for herein-described compositions and have been found to compare favorably with those for lead molybdate and germanium. Typical values of figure of merit ($M_2$) are shown in the following table for deflection of electromagnetic radiation of various wavelengths ($\lambda$) by these three materials.

TABLE I

| | PbMoO$_4$ | Chalcogenide Glass | Germanium |
|---|---|---|---|
| $\lambda$ | 0.63 $\mu$ | 1.06 $\mu$ | 10.6 $\mu$ |
| $M_2$ | 20 | 233 | 540 |

Appreciation of the significance of these values is aided by an understanding that the acoustic power required to deflect a given fraction of a beam of radiation decreases with increasing figure of merit, but increases with increasing wavelength as the square of the wavelength. Thus, 28 times more acoustic power is required for device operation at 1.06 $\mu$ than at 0.63 $\mu$, and 280 times more power is required at 10.6 $\mu$ than at 0.63 $\mu$. However, the higher figures of merit for chalcogenide glasses and germanium reduce the required power for use at the longer wavelengths to the same order of magnitude as is required for visible use.

Referring now to FIG. 3, there is shown one embodiment of an ultrasonic device in accordance with the invention, including ultrasonic transmission medium 30, piezoelectric transducers 31 and 32 attached to opposite parallel bases of medium 30 by means of bonding layers 33 and 34, which layers also act as electrodes. Additional electrodes 35 and 36 are attached to the external bases of transducers 31 and 32. Electrical input to and output from transducers 31 and 32 is through leads 37 and 38, each attached to an electrode pair and connected to appropriate circuitry, not shown. Delay medium 30, although depicted as having a rectangular shape, may be of any shape, such as cylindrical and polygonal, and size to give delay times consistent with the intended device application. Typical delay times could be from 10 to 1,000 microseconds. At least one face of the delay medium should be smooth and preferably polished so that the input and output transducers may be affixed thereto in such a manner as to minimize distortion of the acoustic pulses.

The transducers 31 and 32 may be any of a number of piezoelectric crystals known to be useful for converting electric energy to acoustic energy, such as sodium, potassium niobate, lithium niobate and quartz.

It is a particular advantage of the materials herein described that they may be formed with relative ease into large sections of optical quality and may therefore find use in large delay line configurations having delay times of the order of 1,000 microseconds.

Referring now to FIG. 4, there is shown another embodiment of an ultrasonic delay line in which the delay medium is a composite structure comprised of a material 40 of the invention and a second delay medium 41. Such a structure is described in copending application Ser. No. 601,716 filed Dec. 14, 1966, now U.S. Pat. No. 3,517,345, assigned to the present assignee. As is pointed out in the copending application, the materials are advantageously chosen to have temperature coefficients of delay time that are opposite in sign and lengths such that a zero temperature coefficient results for the composite structure. In the figure, the two sections 40 and 41 of the delay medium are shown to have lengths $x$ and $y$. Electromechanical transducers 42 and 43 are electrodes 44, 45, 46 and 47 and leads 48 and 49 are provided in the customary manner. The relative lengths $x$ and $y$ are computed from the relationship:

$$adx = bd'y \qquad (2)$$

where $a$ and $b$ are the absolute values of the coefficients of delay time versus temperature and have opposite signs and $d$ and $d'$ are the unit delay times for the materials having their lengths defined as $x$ and $y$, respectively. The total desired delay time is given by $dx + d'y$. A suitable delay medium having a sign of delay time opposite to that of the glasses described herein for use in the composite structure is fused silica.

GLASS COMPOSITIONS

The regions of low acoustic loss glass compositions occur within larger glass-forming regions of the ternary systems containing germanium, one element from the group including sulphur and selenium, and one element from the group including arsenic, phosphorus, and antimony. For each system, the low loss compositions may be defined by the area enclosed by connecting with straight lines the following point pairs on the ternary diagrams.

For the system Ge-Se-As, shown in FIG. 5, the point pairs are defined by the following compositions in atom percent:

| | |
|---|---|
| 43 Ge, 27 Se, 30 As | — 40 Ge, 20 Se, 40 As |
| 40 Ge, 20 Se, 40 As | — 25 Ge, 20 Se, 55 As |
| 25 Ge, 20 Se, 55 As | — 25 Ge, 73 Se, 2 As |
| 25 Ge, 73 Se, 2 As | — 42 Ge, 56 Se, 2 As |
| 42 Ge, 56 Se, 2 As | — 43 Ge, 27 Se, 30 As. |

Figure 6:
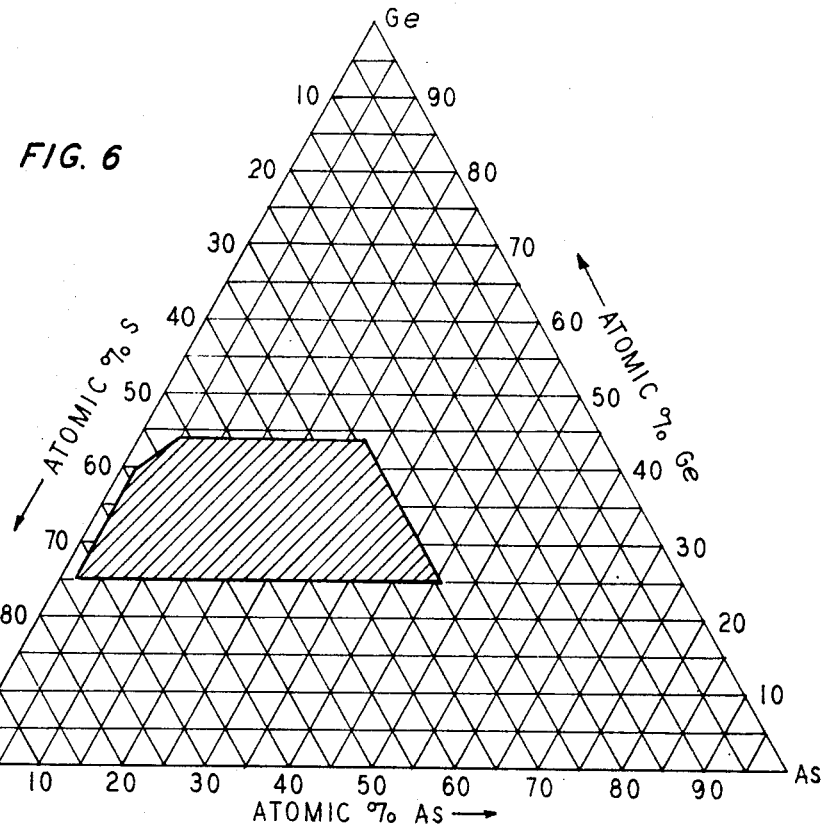

For the system Ge-S-As shown in FIG. 6, the point pairs are defined by the following compositions in atom percent:

| | |
|---|---|
| 44 Ge, 29 S, 27 As | — 25 Ge, 29 S, 46 As |
| 25 Ge, 29 S, 46 As | — 25 Ge, 73 S, 2 As |
| 25 Ge, 73 S, 2 As | — 40 Ge, 58 S, 2 As |
| 40 Ge, 58 S, 2 As | — 44 Ge, 50 S, 6 As |
| 44 Ge, 50 S, 6 As | — 44 Ge, 29 S, 27 As. |

When transmission of the electromagnetic radiation in the short wavelength region of the transmission bandwidth of the material, for example, 1.06 microns, is desired, compositions from the above two ternary systems containing from 2 to 5 atom percent arsenic are preferred to minimize optic transmission losses.

Figure 7:
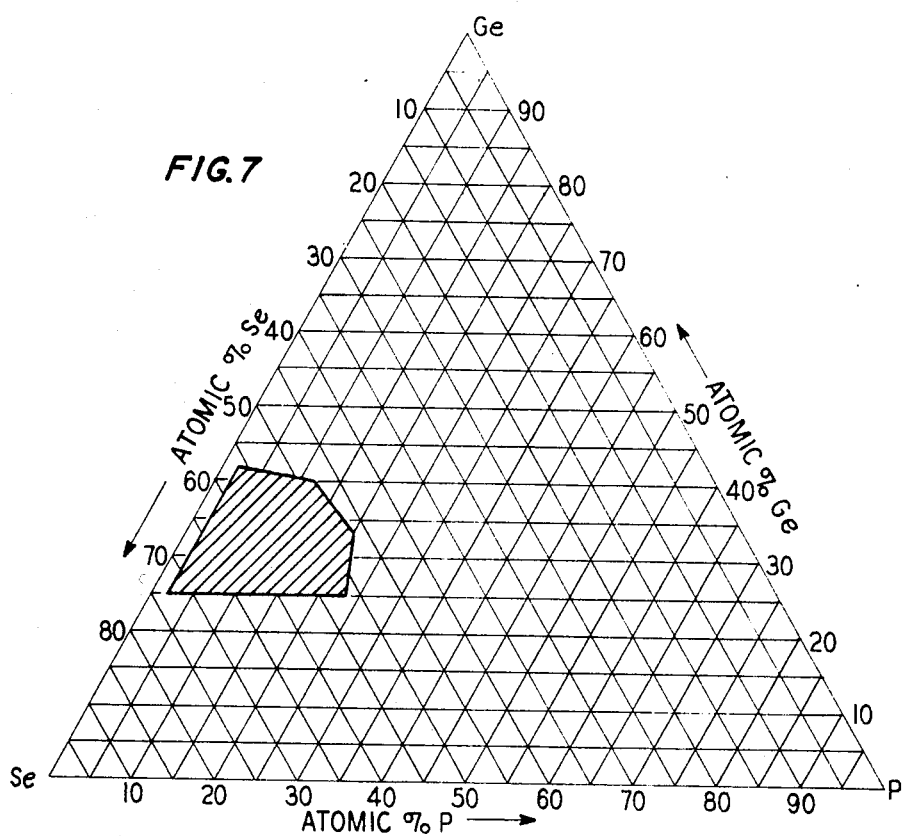
FIG. 7 is a diagram similar to that of FIG. 5 for the system Ge-Se-P.

For the system Ge-Se-P shown in FIG. 7, the point pairs are defined by the following compositions in atom percent:

| | |
|---|---|
| 40 Ge, 48 Se, 12 P | — 33 Ge, 47 Se, 20 P |
| 33 Ge, 47 Se, 20 P | — 25 Ge, 52 Se, 23 P |
| 25 Ge, 52 Se, 23 P | — 25 Ge, 73 Se, 2 P |
| 25 Ge, 73 Se, 2 P | — 42 Ge, 56 Se, 2 P |
| 42 Ge, 56 Se, 2 P | — 40 Ge, 48 Se, 12 P. |

Figure 8:
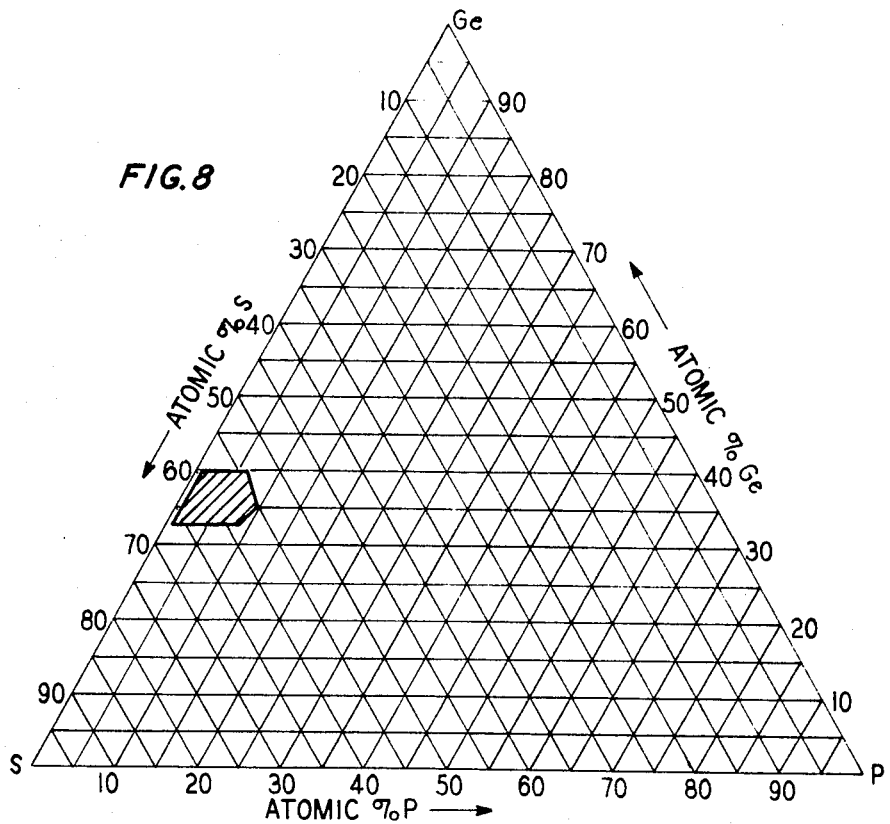
FIG. 8 is a diagram similar to that of FIG. 5 for the system Ge-S-P.

For the system Ge-S-P shown in FIG. 8, the point pairs are defined by the following compositions in atom percent:

| | |
|---|---|
| 40 Ge, 54 S, 6 P | — 35 Ge, 55 S, 10 P |
| 35 Ge, 55 S, 10 P | — 33 Ge, 58 S, 9 P |
| 33 Ge, 58 S, 9 P | — 33 Ge, 66 S, 1 P |
| 33 Ge, 66 S, 1 P | — 40 Ge, 59 S, 1 P |
| 40 Ge, 59 S, 1 P | — 40 Ge, 54 S, 6 P. |

Figure 9:
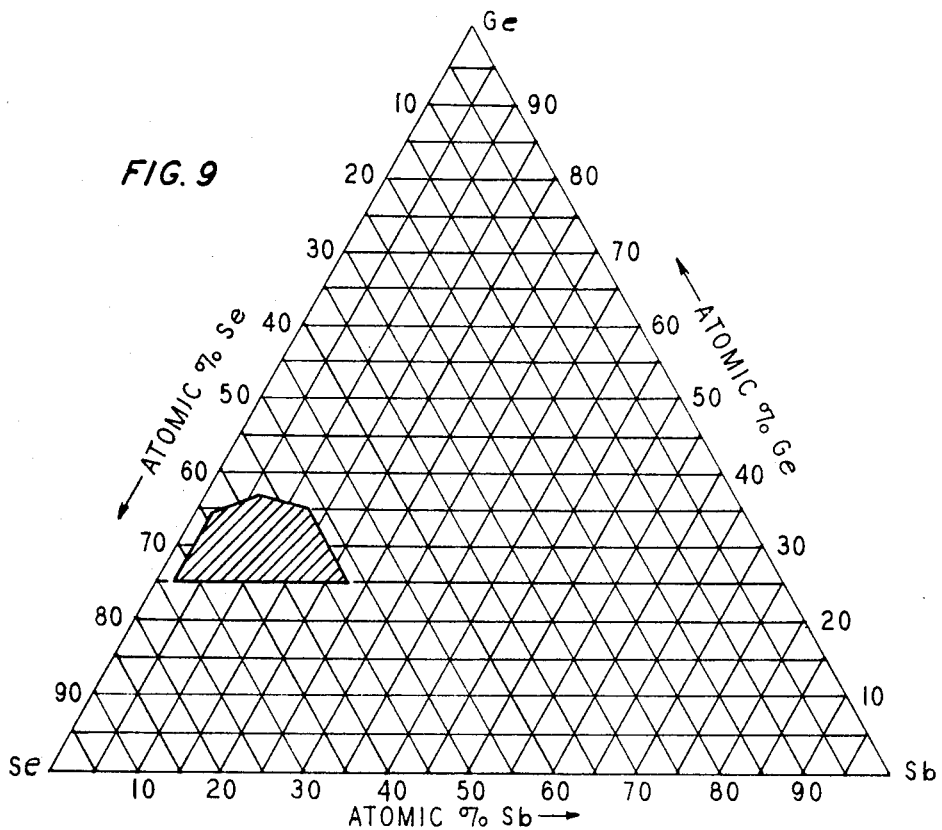
FIG. 9 is a diagram similar to that of FIG. 5 for the system Ge-Se-Sb.

For the system Ge-Se-Sb, shown in FIG. 9, the point pairs are defined by the following compositions in atom percent:

| | |
|---|---|
| 37 Ge, 57 Se, 6 Sb | — 35 Ge, 52 Se, 13 Sb |
| 35 Ge, 52 Se, 13 Sb | — 25 Ge, 52 Se, 23 Sb |
| 25 Ge, 52 Se, 23 Sb | — 25 Ge, 73 Se, 2 Sb |
| 25 Ge, 73 Se, 2 Sb | — 34 Ge, 64 Se, 2 Sb |
| 34 Ge, 64 Se, 2 Sb | — 37 Ge, 57 Se, 6 Sb. |

Figure 10:
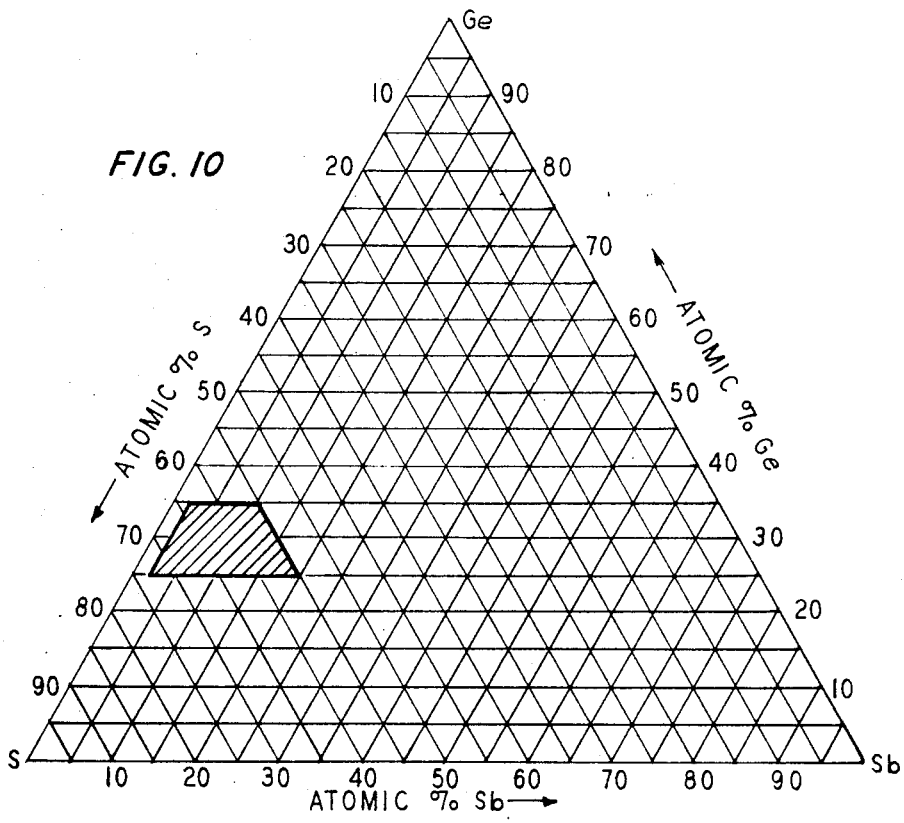
FIG. 10 is a diagram similar to that of FIG. 5 for the system Ge-S-Sb.

For the system Ge-S-Sb, shown in FIG. 10, the point pairs are defined by the following compositions in atom percent:

| | |
|---|---|
| 35 Ge, 63 S, 2 Sb | — 35 Ge, 55 S, 10 Sb |
| 35 Ge, 55 S, 10 Sb | — 25 Ge, 55 S, 20 Sb |
| 25 Ge, 55 S, 20 Sb | — 25 Ge, 73 S, 2 Sb |
| 25 Ge, 73 S, 2 Sb | — 35 Ge, 63 S, 2 Sb. |

In each of the six above-described ternary systems, the low-loss characteristics may be substantially retained and certain other beneficial effects realized by substituting up to about 50 percent by weight of 5a for 5a elements or 6a for 6a elements. Such substitutions may result in improved chemical or physical stability, and may be utilized to achieve some adjustment of working characteristics such as softening point, as is known to those skilled in the glassmaking art. Other additives or unintended impurities such as transition elements or alkali metals, should ordinarily be kept below about 0.1 percent total for best results, although may be as high as 0.5 percent without substantial impairment of low-acoustic-loss characteristics. However, unwanted optical absorption bands may result. Thus, commercially available starting materials are generally suitable for use in preparing such glasses for delay time applications, but higher purity material may be needed for acoustic-optic devices.

The usual methods for preparing these types of glasses are generally known and thus not a necessary part of this description; they are described, for example, in U.S. Pat. No. 3,370,964, issued to A. R. Hilton on Feb. 27, 1968, and by A. D. Pearson in *Journal of Non-Crystalline Solids*, Volume 2, Jan. 1970, p. 2.

EXAMPLE 1

A glass having the composition in atom percent 33 Ge, 12 As, 55 Se was prepared and samples of the glass were prepared for testing.

Acoustic loss and acoustic velocity measurements were made at frequencies of 20 MHz and 500 MHz using the pulse echo technique in which one transducer was used both to transmit and receive pulses. Loss was determined by measuring the rate of decay of the received pulse echoes. Velocity was determined by utilizing a refinement of the pulse superposition technique. The details of this technique may be found in *J. Acoust. Soc. Am.* 34 609 (1962). Transducers were polished x-cut quartz plates. In addition to these measurements, various other properties were also determined. Results are presented in Table II together with some representative values for fused silica.

TABLE II

| Properties | Values: 33 Ge, 12 As, 55 Se | |
|---|---|---|
| | Chalcogenide glass | Fused silica |
| Loss db/cm. at 500 mHz: | | |
| Shear | 9.4 | 4.4 |
| Longit. | 7.1 | 3.2 |
| Velocity cm./sec.×10⁵: | | |
| Shear | 1.432 | 3.774 |
| Longit. | 2.518 | 5.973 |
| T.C. velocity p.p.m./° C.: | | |
| Shear | −55 | +76 |
| Longit. | −71 | +110 |
| Density gm./cc | 4.40 | 2.203 |
| Softening temperature (viscosity $10^{7.6}$ poise) in ° C | 474 | >1,500 |
| Acousto-optic figure of merit ($M_2$) | 164 | 1 |
| Optical transmission range in microns | 1–14 | 0.2–2.5 |
| Refractive index at 1 micron | 2.7 | 1.46 |

It will be noted that acoustic velocity in the chalcogenide glass is about one-half that in fused silica. Thus, in acoustic transmission applications requiring specific delay times, the size of delay devices may be reduced by a factor of about two by replacing fused silica as the delay medium with a glass composition of the invention. In addition, although the acoustic loss on a decibel per centimeter basis of the chalcogenide glass is about twice that of fused silica, due to the low acoustic velocity in the chalcogenide glass, the loss on a decibel per microsecond basis is directly comparable to that of fused silica, the lowest-loss glassy material known.

It will also be noted from Table I that the temperature coefficients of acoustic velocity of the chalcogenide glass and fused silica are comparable in magnitude, but opposite in sign, making these two materials an excellent match for a composite ultrasonic delay line, as described above. The acousto-optic figure of merit $M_2$ of 164 is seen to be in good agreement with the value of 233 calculated from equation (1); the high value of refractive index and low value of acoustic velocity contribute significantly to the figure of merit, as may be seen by examining equation (1).

EXAMPLE 2

Several other compositions including compositions both from within and outside and above-described areas of the ternary systems were prepared in the manner described in Example 1 and acoustic loss and acoustic velocity measured for samples from the compositional melts. These compositions and their longitudinal loss and some longitudinal velocity values are reported in Table III. Loss values for compositions of the invention are reported at 500 megahertz, while loss values for the remaining compositions, in general being too large for convenient measurement at 500 MHz, are reported at 20 MHz.

TABLE III

| Glass Composition (atomic %) | Longit. Acoustic Loss at 20 MHz (db/cm) | Longit. Acoustic Loss at 500 MHz (db/cm) | Longit. Acoustic Velocity (cm/sec×10⁵) |
|---|---|---|---|
| Ge-As-S | | | |
| 15-35-50 | 30 | | |
| 20-25-55 | 12 | | |
| 10-20-70 | 6 | | |
| 30-5-65 | | 10 | |
| 30-10-60 | | 18 | 2.70 |
| 33-33-33 | | 7 | 3.36 |
| 37-3-60 | | 11 | |
| 40-15-45 | | 6 | 3.15 |
| Ge-P-S | | | |
| 30-6-64 | 1 | | |
| 30-10-60 | 3 | | |
| 35-5-65 | | 13 | 2.95 |
| Ge-Sb-S | | | |
| 30-10-60 | | 12 | 2.76 |
| Ge-As-Se | | | |
| 20-12-68 | 2 | | |
| 15-35-50 | 3 | | |

| | | |
|---|---|---|
| 37-3-60 | 14 | |
| 33-12-55 | 7 | 2.51 |
| 33-33-33 | 8 | |
| Ge-Sb-Se | | |
| 28-12-60 | 12 | 2.38 |
| Ge-P-Se | | |
| 15-15-70 | 4 | |
| 30-10-60 | 14 | 2.36 |
| 37-3-60 | 20 | |

It will be seen from the table that each of the compositions falling within the above-described areas of the ternary diagrams exhibits values of acoustic loss and acoustic velocity comparable to those of the composition described in Example 1, which values establish the utility of these compositions for the intended device uses.

We claim:

1. A device for modifying a beam of electromagnetic radiation comprising: an acousto-optic material together with means for introducing the beam thereto, so that at least a portion of said beam passes through said material in a first direction, and means for transmitting acoustic pulses through said material in a second direction substantially transverse to the beam direction, characterized in that said acousto-optic material is a glass comprising from 25 to 44 atom percent germanium, 1 to 55 atom percent of at least one element selected from the group consisting of phosphorus, arsenic and antimony and 20 to 73 atom percent of at least one element selected from the group consisting of sulphur and selenium.

2. The device of claim 1 in which the acousto-optic material has a composition within an area of the ternary diagram for germanium, selenium and arsenic formed by connecting with straight lines the following point pairs:

| | |
|---|---|
| 43 Ge, 27 Se, 30 As | — 40 Ge, 20 Se, 40 As |
| 40 Ge, 20 Se, 40 As | — 25 Ge, 20 Se, 55 As |
| 25 Ge, 20 Se, 55 As | — 25 Ge, 73 Se, 2 As |
| 25 Ge, 73 Se, 2 As | — 42 Ge, 56 Se, 2 As |
| 42 Ge, 56 Se, 2 As | — 43 Ge, 27 Se, 30 As. |

3. The device of claim 2 in which said material contains from 2 to 5 atom percent of arsenic.

4. The device of claim 1 in which the acousto-optic material has a composition within an area of the ternary diagram for germanium, sulfur and arsenic formed by connecting with straight lines the following point pairs:

| | |
|---|---|
| 44 Ge, 29 S, 27 As | — 25 Ge, 29 S, 46 As |
| 25 Ge, 29 S, 46 As | — 25 Ge, 73 S, 2 As |
| 25 Ge, 73 S, 2 As | — 40 Ge, 58 S, 2 As |
| 40 Ge, 58 S, 2 As | — 44 Ge, 50 S, 6 As |
| 44 Ge, 50 S, 6 As | — 44 Ge, 29 S, 27 As. |

5. The device of claim 4 in which the material contains from 2 to 5 atom percent of arsenic.

6. The device of claim 1 in which the acousto-optic material has a composition within an area of the ternary diagram for germanium, selenium and phosphorus formed by connecting with straight lines the following point pairs:

| | |
|---|---|
| 40 Ge, 48 Se, 12 P | — 33 Ge, 47 Se, 20 P |
| 33 Ge, 47 Se, 20 P | — 25 Ge, 52 Se, 23 P |
| 25 Ge, 52 Se, 23 P | — 25 Ge, 73 Se, 2 P |
| 25 Ge, 73 Se, 2 P | — 42 Ge, 56 Se, 2 P |
| 42 Ge, 56 Se, 2 P | — 40 Ge, 48 Se, 12 P. |

7. The device of claim 1 in which the acousto-optic material has a composition within an area of the ternary diagram for germanium, sulfur and phosphorus formed by connecting with straight lines the following point pairs:

| | |
|---|---|
| 40 Ge, 54 S, 6 P | — 35 Ge, 55 S, 10 P |
| 35 Ge, 55 S, 10 P | — 33 Ge, 58 S, 9 P |
| 33 Ge, 58 S, 9 P | — 33 Ge, 66 S, 1 P |
| 33 Ge, 66 S, 1 P | — 40 Ge, 59 S, 1 P |
| 40 Ge, 59 S, 1 P | — 40 Ge, 54 S, 6 P. |

8. The device of claim 1 in which the acousto-optic material has a composition within an area of the ternary diagram for germanium, selenium and antimony formed by connecting with straight lines the following point pairs:

| | |
|---|---|
| 37 Ge, 57 Se, 6 Sb | — 35 Ge, 52 Se, 13 Sb |
| 35 Ge, 52 Se, 13 Sb | — 25 Ge, 52 Se, 23 Sb |
| 25 Ge, 52 Se, 23 Sb | — 25 Ge, 73 Se, 2 Sb |
| 25 Ge, 73 Se, 2 Sb | — 34 Ge, 64 Se, 2 Sb |
| 34 Ge, 64 Se, 2 Sb | — 37 Ge, 57 Se, 6 Sb. |

9. The device of claim 1 in which the acousto-optic material has a composition within an area of the ternary diagram for germanium, sulfur and antimony formed by connecting with straight lines the following point pairs:

| | |
|---|---|
| 35 Ge, 63 S, 2 Sb | — 35 Ge, 55 S, 10 Sb |
| 35 Ge, 55 S, 10 Sb | — 25 Ge, 55 S, 20 Sb |
| 25 Ge, 55 S, 20 Sb | — 25 Ge, 73 S, 2 Sb |
| 25 Ge, 73 S, 2 Sb | — 35 Ge, 63 S, 2 Sb. |

* * * * *

UNITED STATES PATENT OFFICE
CERTIFICATE OF CORRECTION

Patent No. 3,655,255                        Dated April 11, 1972

Inventor(s) John T. Krause, Charles R. Kurkjian

It is certified that error appears in the above-identified patent and that said Letters Patent are hereby corrected as shown below:

On the title page change the title from "Acoustic-Optic Ultrasonic Devices Using Germanium Containing Chalcogenide Glasses" to --Acousto-Optic and Ultrasonic Devices Using Germanium Containing Chalcogenide Glasses--.

Column 1, line 1, change the title from "Acoustic-Optic Ultrasonic Devices Using Germanium Containing Chalcogenide Glasses" to --Acousto-Optic and Ultrasonic Devices Using Germanium Containing Chalcogenide Glasses--;

line 47, after "crystalline" delete "38" and insert --materials--.

Column 4, line 29, after "43" change "are" to --and--.

Signed and sealed this 19th day of September 1972.

(SEAL)
Attest:

EDWARD M. FLETCHER, JR.
Attesting Officer

ROBERT GOTTSCHALK
Commissioner of Patents